United States Patent
Das et al.

(10) Patent No.: US 12,271,917 B2
(45) Date of Patent: Apr. 8, 2025

(54) SKILLS AND TASKS DEMAND FORECASTING

(71) Applicant: International Business Machines Corporation, Armonk, NY (US)

(72) Inventors: Subhro Das, Cambridge, MA (US); Wyatt Clarke, Bronxville, NY (US); Sebastian Steffen, Ithaca, NY (US); Prabhat Maddikunta Reddy, Danbury, CT (US); Erik Brynjolfsson, Palo Alto, CA (US); Martin Fleming, Glen Ellyn, IL (US)

(73) Assignees: International Business Machines Corporation, Armonk, NY (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 396 days.

(21) Appl. No.: 17/159,449

(22) Filed: Jan. 27, 2021

(65) Prior Publication Data
US 2022/0237635 A1   Jul. 28, 2022

(51) Int. Cl.
G06Q 30/00      (2023.01)
G06F 9/445      (2018.01)
G06F 40/40      (2020.01)
G06N 3/044      (2023.01)
G06N 3/08       (2023.01)
G06Q 10/0631    (2023.01)
G06Q 10/105     (2023.01)
(Continued)

(52) U.S. Cl.
CPC ......... *G06Q 30/0202* (2013.01); *G06F 9/445* (2013.01); *G06F 40/40* (2020.01); *G06N 3/044* (2023.01); *G06N 3/08* (2013.01); *G06Q 10/06315* (2013.01); *G06Q 10/105* (2013.01); *G06V 30/414* (2022.01); *G06Q 50/2057* (2013.01)

(58) Field of Classification Search
None
See application file for complete search history.

(56) References Cited

U.S. PATENT DOCUMENTS 7,080,057 B2 * 7/2006 Scarborough ............ G09B 7/02
                                                  706/14
9,818,086 B2 * 11/2017 Thankappan ...... G06Q 10/1053
(Continued)

OTHER PUBLICATIONS

Dawson, Nikolas, et al. "Predicting skill shortages in labor markets: A machine learning approach." 2020 IEEE International Conference on Big Data (Big Data). IEEE, 2020. (Year: 2020).*
(Continued)

*Primary Examiner* — Gurkanwaljit Singh
(74) *Attorney, Agent, or Firm* — Caleb Wilkes; Otterstedt & Kammer PLLC

(57) ABSTRACT

Obtain, as input, in electronic form, structured information including tasks for a plurality of occupations in a plurality of industries over a length of time; compute, from the structured information, a time series of normalized occupation task shares over the length of time; train a computerized machine learning model, on the time series, to predict future task shares for the plurality of occupations in the plurality of industries; and, with the trained computerized machine learning model, predict the future task shares.

15 Claims, 12 Drawing Sheets

THE NETWORK ARCHITECTURE OF MULTI-VARIATE LSTM

ENCODER   REPEATED VECTOR   DECODER

(51) Int. Cl.
*G06Q 30/0202* (2023.01)
*G06V 30/414* (2022.01)
*G06Q 50/20* (2012.01)

(56) References Cited

U.S. PATENT DOCUMENTS

| | | | | |
|---|---|---|---|---|
| 10,803,421 | B1* | 10/2020 | Garg | G06Q 10/1053 |
| 11,062,240 | B2* | 7/2021 | Goyal | G06N 3/048 |
| 2006/0085455 | A1* | 4/2006 | Chmura | G06Q 10/06 |
| 2008/0065467 | A1* | 3/2008 | Nyegaard | G06Q 30/0203 |
| | | | | 705/7.33 |
| 2011/0276355 | A1* | 11/2011 | Bruce | G06Q 10/0631 |
| | | | | 707/769 |
| 2014/0074738 | A1* | 3/2014 | Thankappan | G06Q 10/10 |
| | | | | 705/321 |
| 2015/0161566 | A1* | 6/2015 | Cai | G06Q 10/1053 |
| | | | | 705/321 |
| 2015/0235143 | A1* | 8/2015 | Eder | G16Z 99/00 |
| | | | | 706/12 |
| 2017/0308841 | A1* | 10/2017 | Swaminathan | G06N 5/022 |
| 2017/0365022 | A1* | 12/2017 | Corcoran | G06Q 10/067 |
| 2018/0012170 | A1* | 1/2018 | Roberts | G06F 16/24578 |
| 2018/0025303 | A1* | 1/2018 | Janz | G16H 50/20 |
| | | | | 705/2 |
| 2018/0232751 | A1* | 8/2018 | Terhark | G06Q 10/063118 |
| 2019/0220824 | A1* | 7/2019 | Liu | G06Q 10/1053 |
| 2019/0303773 | A1* | 10/2019 | Kuan | G06N 20/00 |

OTHER PUBLICATIONS

Jordan, Michael I., and Tom M. Mitchell. "Machine learning: Trends, perspectives, and prospects." Science 349.6245 (2015): 255-260. (Year: 2015).*
Brynjolfsson, Erik, and Tom Mitchell. "What can machine learning do? Workforce implications." Science 358.6370 (2017): 1530-1534. (Year: 2017).*
Morgan R. Frank et al. Toward Understanding the Impact of Artificial Intelligence on Labor, National Academy of Sciences; vol. 116; Apr. 2, 2019 pp. 6531-6539.
Patricia Pruder et al. Dynamics of Skills Demand and Job Transition Opportunities: A Machine Learning Approach, Society for Institutional & Organizational Economics; Apr. 12, 2019, pp. 1-21.
Das S, Steffen S, Clarke W, Reddy P Brynjolfsson E, Fleming M, Learning Occupational Task-Shares Dynamics for the Future of Work, In Proceedings of the AAAI/ACM Conference on AI, Ethics, and Society Feb. 7, 2020 (pp. 36-42), First available ArXiv Jan. 28, 2020. (Grace Period Disclosure).
Das S, Steffen S, Reddy P Brynjolfsson E, Fleming M, Forecasting Task-Shares and Characterizing Occupational Change across Industry Sectors, In Harvard CRCS Workshop on AI for Social Good 2020, Jul. 20, 2020.(Grace Period Disclosure) pp. 1-5.
Fleming, Martin, et al. "The future of work: How new technologies are transforming tasks." MIT IBM Watson AI Lab (Oct. 31, 2019). 47 pages.
Duckworth, Paul, Logan Graham, and Michael A. Osborne. "Inferring work task automatability from AI expert evidence. AAAI." ACM Conference on Artificial Intelligence, Ethics, and Society (AIES). 2019. 16 pages.
Acemoglu, Daron, and Pascual Restrepo. "The race between man and machine: Implications of technology for growth, factor shares, and employment." American economic review 108.6 (2018): pp. 1488-1542.
Acemoglu, Daron, and Pascual Restrepo. "Automation and new tasks: How technology displaces and reinstates labor." Journal of Economic Perspectives—vol. 33, No. 2—Spring 2019—pp. 3-30.
Abu Bakar, Nashirah, and Sofian Rosbi. "Autoregressive integrated moving average (ARIMA) model for forecasting cryptocurrency exchange rate in high volatility environment: A new insight of bitcoin transaction." International Journal of Advanced Engineering Research and Science pp. 130-137 [vol. 4, Issue-11, Nov. 2017].

* cited by examiner

| MODEL | RMSE | NRMSE |
|---|---|---|
| LSTM 12 MONTH | 0.00102 | 10.06% |
| LSTM 24 MONTH | 0.000849 | 9.51% |

| LAYER(TYPE) | OUTPUT SHAPE | PARAM |
|---|---|---|
| LSTM | (NONE, 200) | 228800 |
| REPEAT VECTOR | (NONE, 24,200) | 0 |
| LSTM | (NONE, 24,200) | 320800 |
| DROPOUT | (NONE, 24,200) | 0 |
| TIME DISTRIBUTED | (NONE, 24,85) | 17085 |

TABLE 1: NORMALIZED REGRESSION COEFFICIENTS OF TASK-SHARES OF HEALTHCARE & INFORMATION TECHNOLOGY TASK CLUSTER FAMILIES.

| OCCUPATION FAMILY | HEALTH CARE | INFORMATION TECHNOLOGY |
|---|---|---|
| MANAGEMENT | 4.7e-06 | -1.17e-05 |
| COMMUNITY AND SOCIAL SERVICE | -3.26e-05 | -1.31e-05 |
| HEALTHCARE PRACTITIONERS AND TECHNICAL | -3e-06 | -4.94e-05 |
| HEALTHCARE SUPPORT | 2.01e-05 | 4.73e-05 |
| PERSONAL CARE AND SERVICE | 0.0003122 | 0.0003667 |
| OFFICE AND ADMINISTRATIVE SUPPORT | 2e-06 | -5.99e-05 |
| BUSINESS AND FINANCIAL OPERATIONS | -4.8e-05 | -5.57e-05 |
| LIFE, PHYSICAL, AND SOCIAL SCIENCE | -7.67e-05 | -4.24e-05 |
| EDUCATION, TRAINING, AND LIBRARY | -7.57e-05 | -7.99e-05 |
| PROTECTIVE SERVICE | -9.62e-05 | -6.47e-05 |
| FOOD PREPARATION AND SERVING RELATED | -1e-05 | -0.0002106 |
| BUILDING AND GROUNDS CLEANING AND MAINTENANCE | -1.16e-05 | 4.6e-05 |
| SALES AND RELATED | -0.0001142 | -0.0001034 |
| TRANSPORTATION AND MATERIAL MOVING | -3.5e-06 | 1.06e-05 |
| COMPUTER AND MATHEMATICAL | 6.7e-06 | -8.32e-05 |
| ARCHITECTURE AND ENGINEERING | 1.8e-06 | -5.59e-05 |
| LEGAL | 0.0001034 | 6.77e-05 |
| ARTS, DESIGN, ENTERTAINMENT, SPORTS, AND MEDIA | 0.000116 | -7.65e-05 |
| CONSTRUCTION AND EXTRACTION | 0.0002009 | 0.0001889 |
| INSTALLATION, MAINTENANCE, AND REPAIR | 5.08e-05 | -4.54e-05 |
| PRODUCTION | 4.23e-05 | -4.88e-05 |

FIG. 8

TABLE 2: NORMALIZED REGRESSION COEFFICIENTS OF TASK-SHARES OF TASK CLUSTER FAMILIES ACROSS HML WAGE OCCUPATIONS

| TASK CLUSTER FAMILY | HIGH WAGE | MID WAGE | LOW WAGE |
|---|---|---|---|
| ADMINISTRATION | 2.25e-05 | -3.67e-05 | 5.77e-05 |
| SALES | -2.75e-05 | -6.7e-06 | -5.03e-05 |
| ENVIRONMENT | -9.31e-05 | -0.000181 | -0.0001135 |
| INDUSTRY KNOWLEDGE | 1.26e-05 | 1.3e-05 | 1.23e-05 |
| DESIGN | -7.6e-06 | -0.0001254 | -0.0003482 |
| RELIGION | -0.0004568 | -0.0002736 | |
| MAINTENANCE, REPAIR, AND INSTALLATION | 8.87e-05 | 4.53e-05 | 0.0001067 |
| HEALTH CARE | -5.5e-06 | 2.87e-05 | 5.9e-05 |
| MARKETING AND PUBLIC RELATIONS | 1.47e-05 | -6.59e-05 | 2.56e-05 |
| FINANCE | -2.63e-05 | -6.32e-05 | -1.91e-05 |
| PUBLIC SAFETY AND NATIONAL SECURITY | -7.26e-05 | 3.8e-05 | 7.83e-05 |
| MANUFACTURING AND PRODUCTION | -2.73e-05 | 3.3e-06 | 3.59e-05 |
| ENERGY AND UTILITIES | -0.0002393 | 2.47e-05 | |
| INFORMATION TECHNOLOGY | -6.18e-05 | -5.71e-05 | -8.6e-05 |
| PERSONAL CARE AND SERVICES | 1.95e-05 | 8.1e-06 | 3.61e-05 |
| ECONOMICS, POLICY, AND SOCIAL STUDIES | -4.37e-05 | -4.44e-05 | -0.0002623 |
| SUPPLY CHAIN AND LOGISTICS | 1.77e-05 | -4.59e-05 | 3.16e-05 |
| SCIENCE AND RESEARCH | -6.52e-05 | -7.92e-05 | -0.0002512 |
| ENGINEERING | -4.46e-05 | -2.59e-05 | 8.83e-05 |
| EDUCATION AND TRAINING | -7.8e-05 | 1.05e-05 | -4.9e-05 |
| ARCHITECTURE AND CONSTRUCTION | 8.3e-05 | 4.32e-05 | -7.35e-05 |
| AGRICULTURE, HORTICULTURE, AND THE OUTDOORS | 1.69e-05 | 7.94e-05 | 4.29e-05 |
| HUMAN RESOURCES | 7.56e-05 | 6.12e-05 | 0.000166 |
| LEGAL | -4.06e-05 | -0.0001084 | -0.0001222 |
| MEDIA AND WRITING | -2.85e-05 | -8.86e-05 | -0.0001016 |
| ANALYSIS | -1.39e-05 | 6e-07 | 5.16e-05 |
| CUSTOMER AND CLIENT SUPPORT | 5.52e-05 | 8e-06 | 1.1e-05 |
| BUSINESS | -7.5e-06 | -5.04e-05 | 0.0001131 |

FIG. 9

TABLE 3: NORMALIZED REGRESSION COEFFICIENTS OF TASK-SHARES OF SELECTED IT TASK CLUSTERS FOR HML WAGE OCCUPATIONS.

| TASK CLUSTERS WITHIN IT | HIGH WAGE | MID WAGE | LOW WAGE |
|---|---|---|---|
| ARTIFICIAL INTELLIGENCE | 0.0003118 | | |
| BIG DATA | 0.0007821 | | |
| SCRIPTING LANGUAGES | 0.0001187 | -4.18e-05 | |
| C AND C++ | -0.0001528 | -0.0001776 | |
| SCRIPTING | -0.000172 | 0.000148 | |
| SQL DATABASES AND PROGRAMMING | -0.0001388 | -0.0002113 | -0.0005945 |
| JAVASCRIPT AND jQUERY | 6.8e-05 | -0.0004148 | -0.0008842 |
| JAVA | -0.0001515 | -0.0001293 | 3.95e-05 |
| CYBERSECURITY | 4.75e-05 | 0.0004113 | -0.0003633 |
| INFORMATION SECURITY | 1.06e-05 | 9.15e-05 | -0.0002753 |
| CLOUD SOLUTIONS | 0.0002228 | -3.8e-05 | -0.0001886 |
| DATA MANAGEMENT | 7.12e-05 | -1.89e-05 | -0.0002002 |

*FIG. 10*

TABLE 4: MEAN ABSOLUTE PERCENTAGE ERROR FOR ONE-STEP AHEAD PREDICTION OF TASK-SHARES.

| TASK CLUSTER FAMILY | HIGH WAGE | MID WAGE | LOW WAGE |
|---|---|---|---|
| CUSTOMER AND CLIENT SUPPORT | 0.98 | 0.72 | 1.98 |
| INDUSTRY KNOWLEDGE | 1.28 | 1.94 | 2.53 |
| SALES | 1.08 | 2.02 | 1.21 |
| HEALTH CARE | 0.73 | 0.66 | 2.46 |
| SUPPLY CHAIN AND LOGISTICS | 0.45 | 1.12 | 1.63 |
| ADMINISTRATION | 0.65 | 0.58 | 1.21 |
| BUSINESS | 0.46 | 0.77 | 2.40 |
| EDUCATION AND TRAINING | 1.11 | 1.65 | 1.70 |
| FINANCE | 0.44 | 0.60 | 4.48 |
| INFORMATION TECHNOLOGY | 0.44 | 0.72 | 1.34 |
| PERSONAL CARE AND SERVICES | 1.73 | 2.24 | 1.53 |
| HUMAN RESOURCES | 0.61 | 1.50 | 2.22 |
| PUBLIC SAFETY AND NATIONAL SECURITY | 2.01 | 2.21 | 4.12 |
| MARKETING AND PUBLIC RELATIONS | 0.91 | 1.02 | 2.55 |
| MEDIA AND WRITING | 0.44 | 1.23 | 4.32 |
| MANUFACTURING AND PRODUCTION | 0.61 | 0.72 | 1.65 |
| ARCHITECTURE AND CONSTRUCTION | 0.77 | 0.95 | 1.93 |
| LEGAL | 0.85 | 1.79 | 5.89 |
| MAINTENANCE, REPAIR, AND INSTALLATION | 0.68 | 0.66 | 1.67 |
| DESIGN | 0.91 | 1.72 | 7.82 |
| ECONOMICS, POLICY, AND SOCIAL STUDIES | 1.24 | 3.14 | 16.00 |
| ANALYSIS | 0.96 | 1.23 | 4.81 |
| SCIENCE AND RESEARCH | 0.98 | 1.23 | 9.11 |
| ENVIRONMENT | 1.01 | 3.06 | 5.64 |
| ENGINEERING | 0.45 | 1.56 | 5.19 |
| ENERGY AND UTILITIES | 1.87 | 2.24 | |
| AGRICULTURE, HORTICULTURE, & OUTDOORS | 3.57 | 2.00 | 1.97 |
| RELIGION | 11.38 | 10.81 | |

*FIG. 11*

SKILLS AND TASKS DEMAND FORECASTING

STATEMENT REGARDING PRIOR DISCLOSURES BY THE INVENTOR OR A JOINT INVENTOR

The following disclosure(s) are submitted under 35 U.S.C. 102(b)(1)(A):
Das S, Steffen S, Clarke W, Reddy P, Brynjolfsson E, Fleming M, Learning Occupational Task-Shares Dynamics for the Future of Work, In Proceedings of the AAAI/ACM Conference on AI, Ethics, and Society 2020 Feb. 7 (pp. 36-42), First available ArXiv 28 Jan. 2020.
Das S, Steffen S, Reddy P, Brynjolfsson E, Fleming M, Forecasting Task-Shares and Characterizing Occupational Change across Industry Sectors, In Harvard CRCS Workshop on AI for Social Good 2020, Jul. 20, 2020.

BACKGROUND

The present invention relates to the electrical, electronic and computer arts, and more specifically, to artificial intelligence (AI), automation, and the like.

AI has started to transform our economy and society; more specifically, AI has the potential to make both labor and machines more productive while simultaneously introducing new tasks into the economy. In this race between AI innovation and task transformation, this decade is expected to see significant changes in the underlying task requirements for various occupations.

SUMMARY

Principles of the invention provide techniques for skills and tasks demand forecasting. In one aspect, an exemplary method includes obtaining, as input, in electronic form, structured information including tasks for a plurality of occupations in a plurality of industries over a length of time; computing, from the structured information, a time series of normalized occupation task shares over the length of time; training a computerized machine learning model, on the time series, to predict future task shares for the plurality of occupations in the plurality of industries; and, with the trained computerized machine learning model, predicting the future task shares.

In another aspect, an exemplary apparatus includes a memory; a non-transitory computer readable medium including computer executable instructions; and at least one processor, coupled to the memory and the non-transitory computer readable medium, and operative to execute the instructions to be operative to obtain, as input, in electronic form, structured information including tasks for a plurality of occupations in a plurality of industries over a length of time; compute, from the structured information, a time series of normalized occupation task shares over the length of time; train a computerized machine learning model, on the time series, to predict future task shares for the plurality of occupations in the plurality of industries; and, with the trained computerized machine learning model, predict the future task shares.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:
improve the technological process of computerized machine learning for skills and tasks demand forecasting by making predictions based on task shares time series;
improve the technological process of managing/provisioning computer resources by reconfiguring information technology (IT) systems such as computer networks, virtualized computing resources, cloud-based computing systems, and the like, based on accurate inferences about future demand for different types of computer-related tasks.

These and other features and advantages of the present invention will become apparent from the following detailed description of illustrative embodiments thereof, which is to be read in connection with the accompanying drawings.

BRIEF DESCRIPTION OF THE DRAWINGS

FIG. 8 shows normalized regression coefficients of task-shares of healthcare & information technology task cluster families;

FIG. 9 shows normalized regression coefficients of task-shares of task cluster families across HML (high, medium, and low) wage occupations;

FIG. 10 shows normalized regression coefficients of task-shares of selected IT task clusters for HML Wage Occupations;

FIG. 11 shows mean absolute percentage error for one-step ahead predictions of task-shares;

DETAILED DESCRIPTION

As noted, AI has started to transform our economy and society; more specifically, AI has the potential to make both labor and machines more productive while simultaneously introducing new tasks into the economy. In this race between AI innovation and task transformation, this decade is expected to see significant changes in the underlying task requirements for various occupations. In recent economics literature, occupations are characterized as bundles of tasks performed by the workers. One or more embodiments provide techniques for building a novel quantitative framework to capture the evolution of occupations in a labor market and the roles of skills/tasks in the transformation. One or more embodiments model the trend, to forecast the shifts in the task-demands for future time.

Consider aspects of occupations, tasks and task-shares. Occupations, viewed from the supply side (workers), involve skills. Occupations, viewed from the demand side (industry), involve tasks to be performed. Tasks could include, for example, ability to perform bookkeeping, ability to program in PYTHON, and so on. Consider tasks $x_i$ and occupations $o_j$ at a time t. Task counts $n_{ijt}$ include the number of times a task is mentioned in job postings. Occupation counts $m_{jt}$ include the number of times an occupation is mentioned in job postings. Normalized occupation task shares $y_{ijt}$ are then obtained by multiplying the occupations shares $e_{jt}$ by the ratio of task counts to occupation counts. Further details are provided below.

Figure 1:
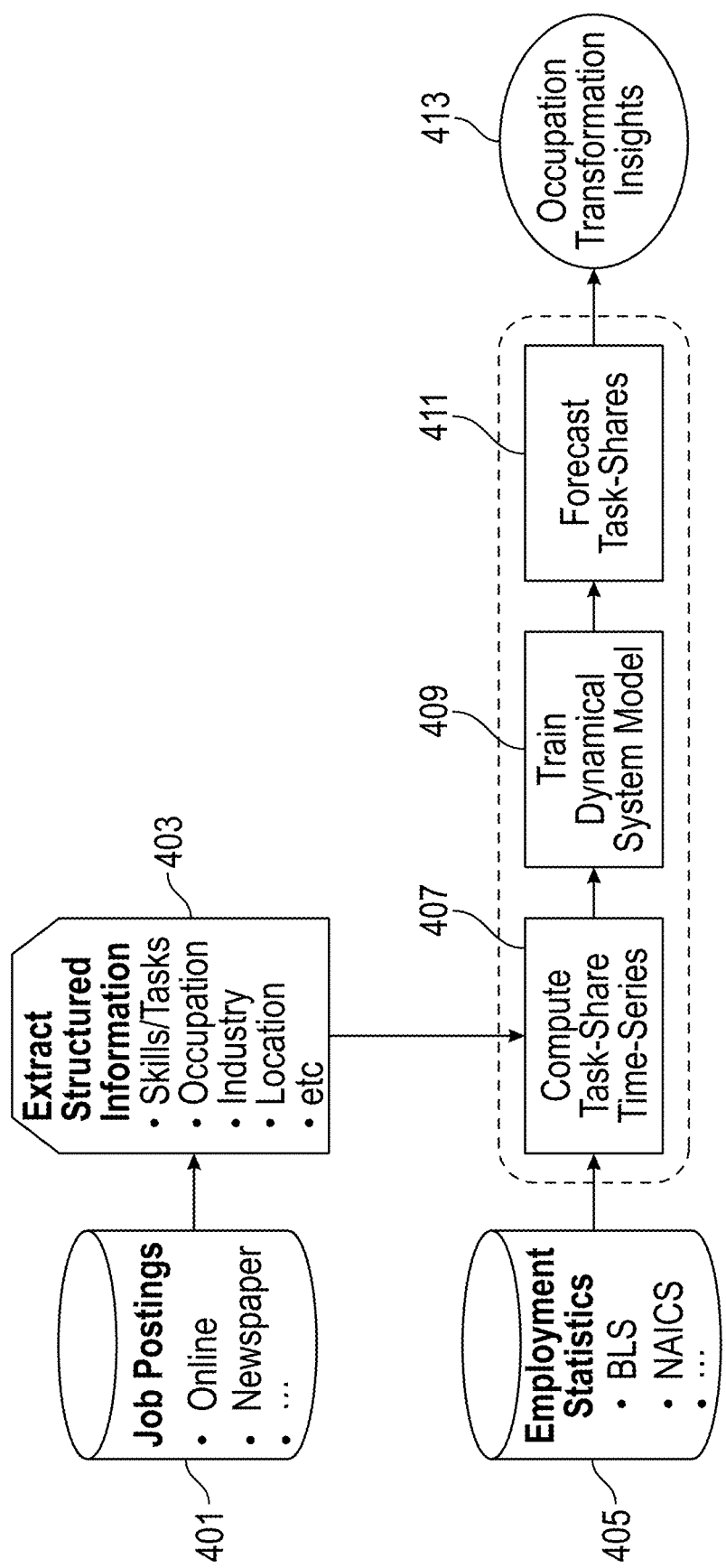
FIG. 1 shows a block diagram, according to an aspect of the invention.

FIG. 1 shows an exemplary system diagram and process overview. Structured information is extracted from job postings 401 as seen at 403. The structured information is provided to block 407 which also takes as input employment statistics 405 and uses information 403, 405 to compute task-share time-series. In block 409, train a dynamical system model based on the time series. In block 411, forecast the task shares using the trained model. The output 413 includes occupation transformation insights. The first module 407 computes the novel task-share metric which is the building block of all occupations. It then converts the metric into a time-series format with a monthly frequency. The second module 409 learns the task-share dynamics and causal relationships between the different tasks. Here, the coupling is estimated across different industry sectors, occupation families and wage groups. These segregated-out coupling factors serve as ensembles for the overall dynamical system model—a pertinent difference from any other dynamical system. The third module 411 produces the forecasting output based on the queries to the "Occupation Transformation Insights." This module is configured to output the future expected task-shares (with bounded mean-squared error) for any industry or occupation in any wage group.

Job postings 401 include text in electronic form. Extraction module 403 accepts as input the raw text from 401 and extracts out skills/tasks per occupation, job title, which industry, which company, which location, and so on, using suitable natural language processing (NLP) techniques ranging from Continuous Bag of Words (CBOW) to BERT (Bidirectional Encoder Representations from Transformers), or the like. Database 405 includes employment statistics, in electronic form, from a suitable source, such as the US Bureau of Labor Statistics, North American Industry Classification System (NAICS) (the standard used by Federal statistical agencies in classifying business establishments for the purpose of collecting, analyzing, and publishing statistical data related to the U.S. business economy), or similar sources from other governmental entities. This will include information on how many people are employed in different occupations, typical salaries, industry codes, etc. Task share module 407 combines the input from 403 and 405 to compute skill shares or task shares (essentially the same as skill shares, with skills being on the supply side and tasks being on the demand side; e.g., knowing how to program in PYTHON is a skill while writing a PYTHON program is a task). Task share module 407 can be implemented, for example, by high-level computer code that carries out the calculation of $y_{ijt}$ as described herein; the high-level code will typically be compiled or interpreted into machine-executable code.

Module 407 outputs time series data. For each task, e.g., PYTHON programming, bookkeeping, sales, etc., there is a time series showing demand for the task over different occupations over time. This time series data is fed into the dynamical system model at 409. Suitable models include ARIMA, LSTM, and so on, as discussed elsewhere herein. The model is trained on the historical data and then the trained model forecasts the future time series at 411 (inferencing). As seen at 413 a suitable GUI displays results by user and use case, powered by the computed task shares.

Figure 2:
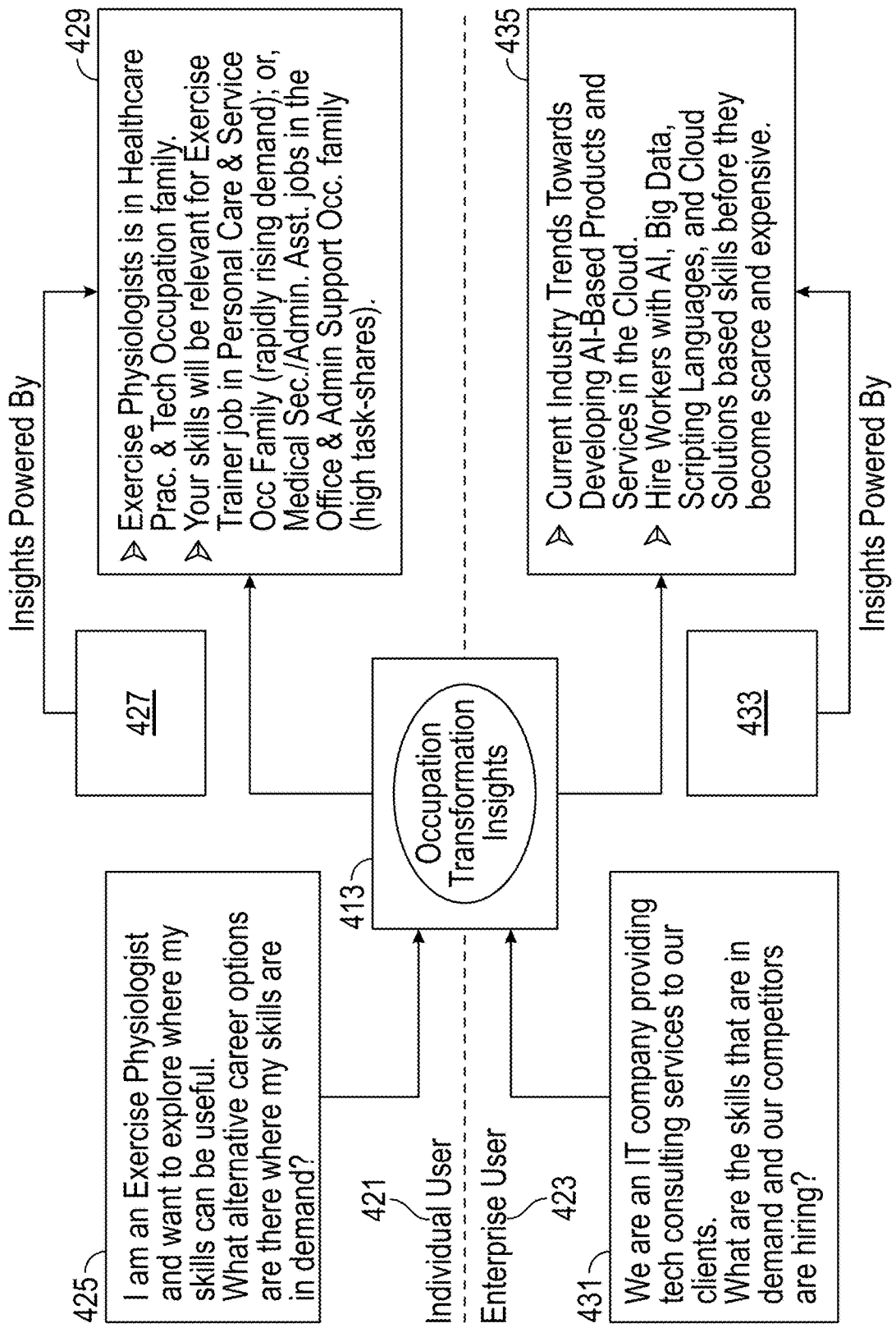
FIG. 2 shows a flow diagram of exemplary uses of aspects of the invention.

FIG. 2 shows how an individual 421 or enterprise 423 user can interact with the system. As seen at 425, an exercise physiologist seeks to explore new employment opportunities, and would like to see what alternative careers could use her or his skill set. Element 427 represents a graph of task share versus time for six different classes of occupations (one of which is healthcare practitioners and technical occupations) which is presented to user 421; details are omitted to avoid clutter. As seen at 429, the system advises the exercise physiologist that the relevant occupation family is healthcare practitioners and technical occupations and the person's skills are also relevant for an "Exercise Trainer" job in the "Personal Care & Service Occ Family" (with rapidly rising demand), or a "Medical Sec./Admin. Asst." job in the "Office & Admin Support Occ. family" (high task-shares).

Further, as seen at 431, an IT company wants to know what skills are in demand for which its competitors are hiring. Element 433 represents a GUI which is presented to enterprise user 423 showing task share versus time for high-wage, low-wage, and mid-wage jobs for twelve different IT-related categories; details are omitted to avoid clutter.

As seen at 435, the system advises the IT company about current trends in AI and cloud, and advises hiring workers familiar with AI-, Big Data-, Scripting Languages-, and Cloud Solutions-based skills before they become scarce and expensive. Graphs such as in FIGS. 3, 8, 13, and 14 are generally representative of the kinds of graphics that can be presented at 427, 433.

Figure 3:
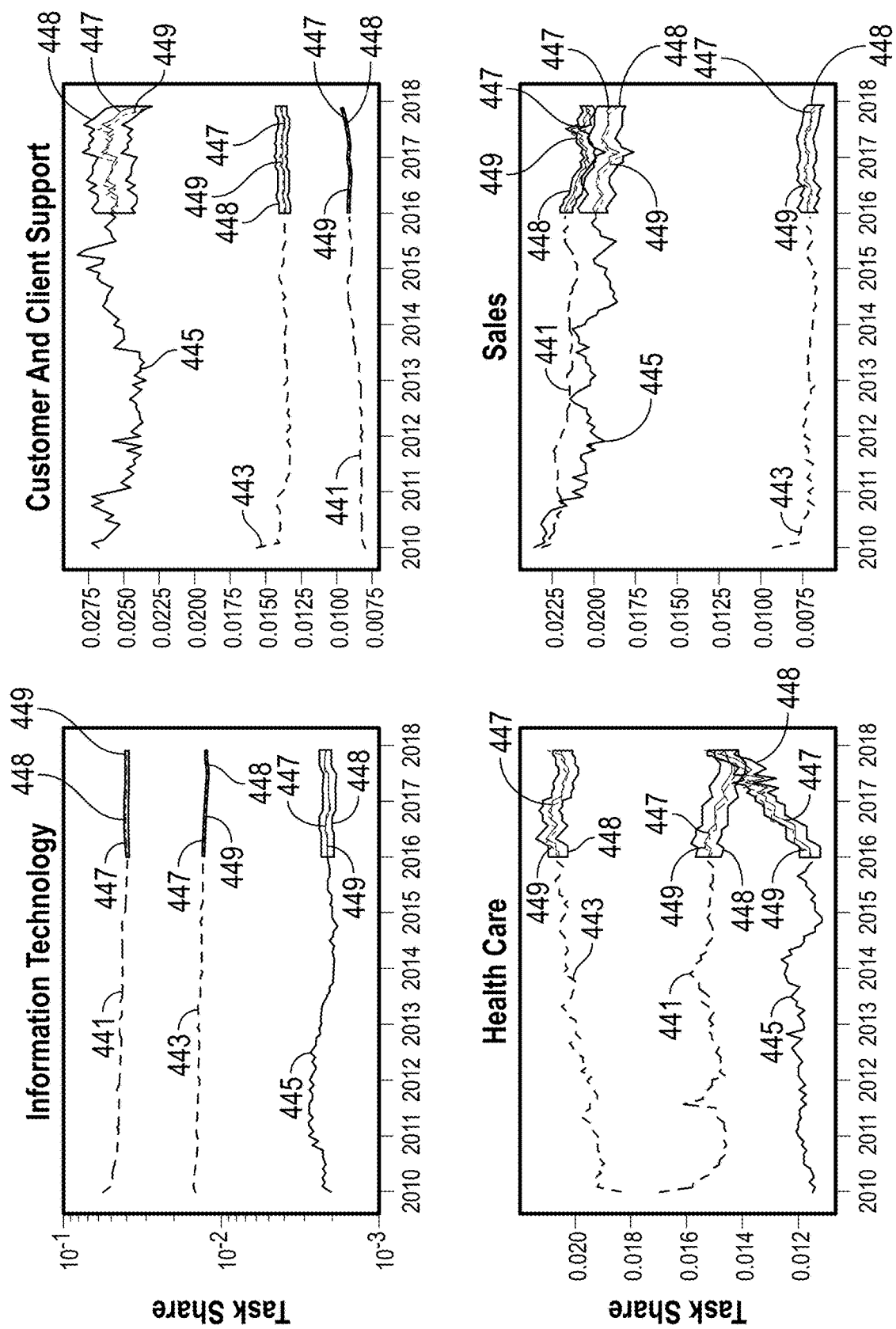
FIG. 3 shows exemplary task share versus time for information technology, customer and client support, health care, and sales.

FIG. 3 shows task-shares forecasting with an autoregressive integrated moving average (ARIMA) model, including training on 72 months of data and testing on 24 months of data. The graphs depict one-month ahead prediction with mean absolute percentage error (MAPE)<5%, for Information Technology (IT), customer/client support, health care, and sales. In particular, the graphs show task-share predictions of task cluster families across high-, mid-, and, low-wage occupations 441, 443, 445.

Figures 4, 5, 6:
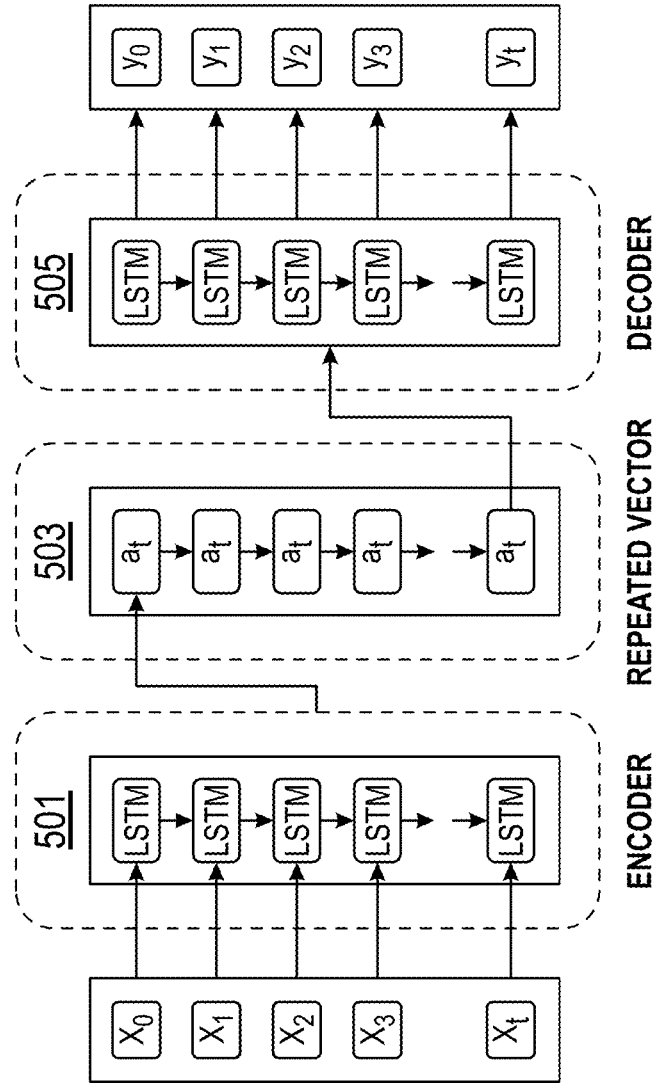
FIG. 4 shows a network architecture of a multi-variate long short-term memory (LSTM) used in aspects of the invention.
FIG. 5 is a table showing network layers of a Seq2Seq encoder-decoder LSTM with dropout, according to an aspect of the invention.
FIG. 6 is a table showing a comparison of the root mean squared error (RMSE) and normalized root mean square error (NRMSE) of predictions of the LSTM model to a persistence model, according to an aspect of the invention.

FIG. 4 shows an exemplary network architecture for multi-variate multi-step ahead forecasting of task-shares, as discussed further below. An input vector includes elements $x_0, x_1, x_2, x_3, \ldots, x_t$, representing task shares for skills 0 through t, in time series form. Encoder 501 represents an intermediate layer where the LSTM transforms the raw time series into another variable to capture the couplings and parameters; note at 503 repeated vector including elements at. Decoder 505 then produces the predictions $y_0, y_1, y_2, y_3, \ldots, y_t$. The table of FIG. 5 shows the Network layers of the Seq2Seq encoder-decoder LSTM with dropout. Comparison of the root mean squared Error (RMSE) and normalized root mean square error (NRMSE) of predictions of the LSTM model to a persistence model is shown in the table of FIG. 6.

One or more embodiments thus include ingesting newspaper job-ads and past online job postings 401 and updating an existing model via batch processing. As seen at 403, one or more embodiments map ads to the standardized occupation codes (e.g., an NLP-based module extracts tasks from the ads). One or more embodiments include a novel normalization sub-module to estimate the task-shares, as seen at 407. As seen at 409, the system uses this novel task-shares metric to train a module to learn: the dynamics of the task-shares across different occupations, wage-groups, industries, geographical areas, and the like; and the coupling between the task-shares of different tasks. Example methods to train such modules are ARIMA, LSTM, and so on. As seen at 411, the system uses this trained dynamical system module to: forecast the task-shares across different occupations, wage-groups, industries, geographical areas, etc.

Thus, one or more embodiments advantageously provide an automated pipeline of a quantitative framework for studying how occupations transform/evolve in a labor market and the roles of skills/tasks in the transformation. One or more embodiments learn the dynamics of occupational task-shares (task demands) and predict future occupational task-shares. Such task demands predictions across occupations will play a pivotal role in retraining the workforce of the future. One or more embodiments address the dynamic evolution of skills/tasks within occupations. One or more embodiments include one or more modules that (a) computes task-shares, (b) learn dynamics of task-shares, and, (c) forecast task-shares. Automated task-share forecasting advantageously reduces the significant financial investments required for retraining/reskilling a workforce to ensure meaningful employment for the members of the workforce during periods of technological change.

One or more embodiments provide a multi-variate and multi-step long short term memory (LSTM) network architecture to estimate 12-month- and 24-month-ahead forecasts of task-shares with a 10% root mean-squared error (these lengths of time are exemplary and non-limiting). The industry-specific insights on occupation evolution and forecasts on task shares will facilitate policy-makers' and strategy leaders' decision-making to transform the current workforce for the future, to help ensure meaningful employment for all. Indeed, as discussed, one or more embodiments provide a forecasting pipeline using long short-term memory (LSTM), an artificial recurrent neural network (RNN) architecture, for 12-months- and 24-months-ahead prediction of occupational task-shares with bounded root mean square errors. One or more embodiments provide AI-based tools to model and forecast the evolution of occupations in a labor market such as the US labor market. The timely forecasts of shifts in occupational task-shares will permit suitable policies to be implemented to ensure adequate employment opportunities for humans as the use of AI expands.

Task-Share Dynamics

One or more embodiments are based on annotated US job postings between 2010 and 2017. From each posting, the job titles are extracted and mapped to the Standard Occupational Classification (SOC) codes and the North American Industry Classification System (NAICS) codes. The SOC defines a taxonomy of occupations including unique 6-digit codes assigned to 867 distinct occupations in the US. As per the US Department of Labor's Bureau of Labor Statistics (BLS), all jobs are mapped to one of these detailed occupations (SOC codes) according to their occupational definition. Similarly, the NAICS codes are unique 6-digit codes that define 317 unique industry groups. The first two-digits of the NAICS codes represent the industry sector, namely, Finance, Manufacturing, Healthcare, etc.

Once each job posting is tagged to an occupation (SOC code) and an industry sector (NAICS code), the tasks, mentioned in the posting, are extracted and mapped to a suitable taxonomy of, for example, around multiple thousands of tasks. The employers have a demand for these tasks, to be performed by the workers in that occupation. The tasks are hierarchically clustered into, for example, hundreds of task clusters and tens of task cluster families. For example, 'Bookkeeping' is a task in the 'General Accounting' task cluster which falls under the 'Finance' task cluster family. Note that a job posting might have tasks that falls under the 'Finance' task cluster family, but it may not be in the 'Finance' industry sector—a hospital which is under the 'Healthcare' industry sector has a job opening for financial bookkeeping, for example.

Task-Share Forecasting

Most state-of-the-art research on the future of work studies the qualitative aspect of how the occupations are changing in the US Labor market, and more generally its global counterpart. Based on these qualitative trends, experts qualitatively predict the future state of occupations five to ten years from now. In contrast, one or more embodiments quantitatively characterize the occupations as a bundle of tasks and derive their corresponding monthly task-shares in a time series format. This design of the study creates a framework to learn the dynamics of the task-shares of different task cluster families and then uses the trained models to predict future task-shares. Representing occupations as bundles of different tasks, such task-share forecasts shed a quantitative light on the future state of occupations.

Multi-Variate LSTM for Multi-Step Prediction:

In one or more embodiments, the task-shares dynamics of each task cluster family are trained using an Autoregressive Integrated Moving Average (ARIMA) model. The trained ARIMA models, one for each task cluster family, are then used to make one-month ahead predictions of the task-shares. Note that: (a) the linear ARIMA model does not capture the intricate non-linear dynamics of the task-shares evolution; (b) the prediction model does not take into consideration the coupling effects between different task cluster families; and (c) a one-month ahead prediction is limited in scope for practical utility. These limitations can advantageously be addressed by implementing a multi-variate Long Short-Term Memory (LSTM), an artificial recurrent neural network (RNN) architecture, trained on the task-shares time series data to predict 12-month- and 24-month-ahead forecasts of the task-shares of different task cluster families. LSTM networks are well-suited to learn the inherent non-linear aspects of the task-shares dynamics, and the multi-variate nature of the LSTM incorporates the coupling effect between the task-shares of different task cluster families while learning the network parameters.

LSTM Architecture & Forecast RMSE:

The task-share data contains tens of task cluster families, each of which is split into, for example, 3 series based on wage tercile (high, medium, or low wage). After dropping the two series with insufficient data, there are, for example, on the order of one hundred task cluster family-wage tercile series. To leverage the coupling effect, the task-share time-series dataset is modeled as parallel time-series, each including monthly task-shares from 2010 to 2017 (96 months), upon which a Seq2Seq encoder-decoder LSTM model is trained for (by way of example and not limitation) 3000 epochs. The architecture of this model is shown in FIG. 4. Using this LSTM model, in our experiments, we made 12- and 24-month-ahead predictions of task-shares. We compared the root mean squared Error (RMSE) and normalized root mean square error (NRMSE) of predictions of the LSTM model to a persistence model as shown in the table of FIG. 6. The table of FIG. 5 shows the Network layers of the Seq2Seq encoder-decoder LSTM with dropout. The number of total parameters and trainable parameters are both on the order of hundreds of thousands.

The NRMSE is around slightly lower for the 24-month-ahead forecast, which seems to support the robustness of this model over longer periods of time, when the effects of outlying monthly fluctuations are reduced. The trained LSTM model is capable of predicting shifts in occupational task shares 2 years ahead of time with around 10% RMSE. This is believed to demonstrate the successful quantitative characterization of occupational changes, and, of the ability to predict the upcoming changes in labor demands.

One or more embodiments thus bring new insights on the future of work by representing occupations in terms of task-shares of the task cluster families.

Automation and (task) innovation lead to changes in occupations' underlying task requirements. One or more embodiments analyze how occupations' specific task demands change by leveraging a large dataset of online job postings, using a novel methodology to document trends in occupations and tasks as well as occupational wage terciles (low, medium, high).

Occupation and Tasks

Occupations can be viewed as bundles of a multitude of tasks performed by workers in that occupation. On the demand side, the employers define the tasks that need to be executed by an employee in the job. On the supply side of the labor market, the employees come with skills; i.e., the capabilities to carry out the required tasks in the job. In an occupation, the workers receive wages based on the skills that they bring in. However, when engaged in an occupation, the workers are required to perform a number of tasks. The wage earned, then, is the weighted average of the wage paid for performing a collection of tasks and providing a portfolio of tasks can be accomplished by workers with a range of skill levels, workers in differing locations, or, where appropriate, substituting capital for labor (for example to use machines to perform dangerous jobs so as to safeguard the well-being of workers). Tasks can be considered to study how occupations are transforming.

In our experiments, we used data including millions of online job vacancy postings posted on thousands of distinct online job sites in the United States between 2010 and 2018. Each vacancy posting was parsed and annotated with the posting date, the Standard Occupational Classification (SOC) code, and which tasks were demanded, among several other variables. Such parsing and annotation tasks can be carried out using suitable natural language processing techniques. The tasks data was parsed using a well-known taxonomy, which covered thousands of tasks, which are nested within hundreds of task clusters and tens of task cluster families. For example, Python is a task within the Scripting Languages task cluster, which itself falls into the Information Technology task cluster family. The data we used was ideal for these purposes because it encodes jobs as bundles of tasks.

There is some ambiguity as to whether the content of job postings describe skills of workers or tasks workers are required to perform. Because firms do not know workers' skills before hiring—ex ante—and because firms know with near certainty the tasks workers are to perform, in what follows, the requirements will be referred to as tasks. Such a distinction is consistent with the theory that tasks are specified by employers on the demand side and skills are the capabilities workers bring on the supply side. Job postings do not always reflect workers' roles precisely. Especially in tight labor markets, the eventual responsibilities of workers might differ from intentions at hiring. In addition, postings also reflect marginal rather than average occupational changes. The marginal changes can reflect replacement demand as well as net new demand.

Task-Occupation Pairs

Job postings data can be represented in three dimensions: occupations, tasks, and years. Each job posting is mapped to one of hundreds of unique occupations, as defined by 6-digit Standard Occupational Classification (SOC) code by the Bureau of Labor Statistics (BLS) of the U.S. Department of Labor. The tasks, required to be performed by a worker as mentioned in the posting, are extracted and tied to the mapped occupation (SOC) for that posting. This method enumerates the number of times a task has been mentioned for a particular occupation within a given period of time. The minimum and maximum number of occupations that a task has been associated to are 1 and multiple hundreds, respectively. There are 15 tasks that are mentioned in more than 300 occupations, namely 'Communication Skills,' 'Computer Literacy,' 'Organizational Skills,' 'Writing,' 'Teamwork/Collaboration,' 'Scheduling,' 'Detail-Oriented,' 'Physical Abilities,' 'Customer Service,' 'English,' 'Research,' 'Problem Solving,' 'Microsoft Excel,' 'Written Communication,' and 'Planning.' In contrast, there are thousands of tasks that occur in fewer than 10 occupations. Some of the tasks that appear in only one occupation are: Plastic Industry Knowledge, Polymer Synthesis, Polish, Aromatherapy, Poetry, E-Procurement, Planters, Physician Sales, Plant Biology, Pizza Delivery, Aircraft Electrical Systems, Piping Replacement, Hbase, Airframe Powerplant, Construction Documentation, etc.

The minimum and maximum number of tasks that are associated to an occupation are 1 and multiple thousands, respectively. There are nine occupations that have more than 1,000 unique tasks mentioned in their job postings, namely 'Software Developers, Applications,' 'Managers, All Other,' 'Sales Representatives, Wholesale & Manufacturing,' 'Computer Systems Analysts,' 'Management Analysts,' 'Medical & Health Services Managers,' 'Marketing Managers,' 'General & Operations Managers,' and 'Sales Managers.' Seven out these nine occupations are in the Management and Computer & Mathematical occupation families, with occupations 'Software Developers, Applications' (SOC: 15-1132) and 'Managers, All Other' (SOC: 11-9199) reporting even more than 2,000 tasks. On the other end, there are hundreds of occupations which require less than 10 unique tasks, with on the order of tens among those that asked for only one unique task in their postings. Most of these jobs are in the Transportation & Material Moving, Production, Construction & Extraction, and, Installation, Maintenance, & Repair occupation families. This could be due to the fact that there were not many postings related to these occupations in the data or those jobs actually require one task.

The hundreds of unique occupations, represented by 6-digit occupation codes, can be categorized into tens of occupation families represented by the first 2-digits of their 6-digit SOC codes. There are hundreds of unique task cluster family and occupation family pairs.

Methodology: Task-Share Dynamics

To understand how the occupations are evolving, in our experiments, we analyzed in greater detail how tasks within the occupations are changing. From the job postings, we obtained the occurrence frequency of each task in a given occupation. Using the tasks count in postings for each occupation, a time-series dataset was generated. This measures the demand from employers for workers who can perform these tasks. We incorporated wages and employment shares data from the Bureau of Labor Statistics (BLS), who publish annual statistics of the average wages and number of employees in each of the almost one thousand occupations. We normalized the task demand time-series data by the share of workers employed in that occupation, to derive the unique task-shares dynamics data for each task-occupation pair. The changes in the occupations during that period were characterized via the evolution of the task-shares within each occupation.

Monthly Task-Share Time-Series:

Denote a task by $x_i$, where $x_i \in \chi = \{x_1, \ldots, x_i, \ldots, x_{|\chi|}\}$, and $|\chi|$ is the total number of unique tasks in the economy. An occupation is denoted by $o_j$, where $o_j \in O = \{o_1, \ldots, o_j, \ldots, o_{|O|}\}$, and $|O|$ is the total number of unique occupations. Let, t denote the monthly time index from January 2010 to December 2018, i.e., $t \in T = \{01\text{-}2010, \ldots, 12\text{-}2018\}$, with $|T|=96$. With these notations, the count of mentions of task $x_i$ in occupation in month t is represented by $n_{i,j,t} \in Z^+$. Similarly, let $m_{j,t} \in Z^+$ denote the count of mentions of occupation $o_j$ in month t. It should be noted that lengths of time different than January 2010 to December 2018 and time periods other than monthly could be used in other embodiments.

Under the assumption that the distribution of tasks demanded in a job listing reflects the distribution of tasks performed by workers in the corresponding occupation, calculate the share of workers in each occupation that perform each task. The occupation-task share, $z_{i,j,t} \in R^+$, is:

$$z_{i,j,t} = \frac{n_{i,j,t}}{m_{j,t}}, \forall\, i, j, t. \tag{1}$$

To normalize the occupation-task share with an external baseline, use the annual statistics of the average hourly wage and number of employees in the almost one thousand SOC occupations published by the BLS. A piece-wise linear interpolation function was employed for converting the annual statistics to monthly statistics in order to obtain hourly wages, $w_{j,t} \in R^+$, and number of employees, $E_{j,t} \in Z^+$, for each occupation $o_j$-month t combination. The share of the labor force, $e_{j,t} \in R^+$, employed in each occupation in the U.S. can be calculated by:

$$e_{j,t} = \frac{E_{j,t}}{\sum_j E_{j,t}}, \forall\, j, t. \tag{2}$$

While online job postings account for a significant share of recruiting activity during 2010-2018, their share is increasing over time. Moreover, job listings may not be fully reflective of all available jobs; for example, they may include many white-collar jobs but omit some blue collar jobs, and may not perfectly represent current employer demands, such that these data are not necessarily representative of the US labor force. Hence, we combine the BLS employment share $e_{j,t}$ with the electronic job posting occupation-task share $z_{i,j,t}$ to compute the overall share of workers performing task $x_i$ as part of occupation $o_j$ in month t as:

$$y_{i,j,t} = e_{j,t} \times z_{i,j,t}, \forall\, i, j, t. \tag{3}$$

This occupation-task employment share $y_{i,j,t} \in R^+$ is referred to as task-share—a time-varying metric for each task $x_i$ performed in an occupation $o_j$. Using this metric, a unique time-series dataset was created, containing task-share $y_{i,j,t}$ of all the tasks across all occupations over the period of 96 months from January 2010 to December 2018. This dataset presents the task shares at a monthly frequency for each task-occupation pair.

Task-Share Aggregation:

For further analyses and to extract insights on how the task-share dynamics are impacting the evolution of the occupations in the U.S. labor market, this large time-series dataset on task-occupations pairs should be aggregated. In our experiments, we aggregated the task-shares of all task-occupation pairs at a task cluster family and occupation family levels denoted by $y_{p,q,t}$. Let, $x_p$ denote a task cluster family, where $x_p \in \chi = \{x_1, x_2, \ldots, x_p, \ldots, x_{|\chi|}\}$ and $|\chi|=28$ is the total number of unique task cluster families. Similarly, an occupation family is denoted by $o_q$, where $o_q \in o = \{o_1, o_2, \ldots, o_q, \ldots, o_{|O|}\}$ and $|O|=22$ is the total number of occupation families. Then, the aggregated task-share $y_{p,q,t}$ of workers performing tasks from task cluster family $x_p$ as part of occupations from occupation family $o_q$ in the month t is:

$$\bar{y}_{p,q,t} = \sum_{i,j: x_i \in \bar{x}_p, o_j \in \bar{o}_q} y_{i,j,t}, \forall\, p, q, t, \tag{4}$$

This aggregated task-share $y_{p,q,t}$ helps to visualize and interpret how the demand for a particular family of tasks have evolved across different occupation families, or, how the task-shares of different cluster families of tasks have evolved within a particular occupation family.

In our experiments, we further aggregated the task-shares data among the high, mid, and low (HML) wage occupation terciles, denoted by $\tilde{y}_{p,r,t}$, to understand how the task-shares of different task cluster families have evolved across wage-based occupation groups. Using the average of the BLS hourly wage $w_{j,t}$ from year 2010, the almost one thousand occupations $o_j$ are categorized into three wage bins, or E {low, mid, high}. Thus, the task-share $\tilde{y}_{p,r,t}$ of workers performing tasks from task cluster family $\bar{x}_p$ as part of occupations from occupation tercile $\bar{o}_r$ in month t is:

$$\tilde{y}_{p,r,t} = \sum_{i,j: x_i \in \bar{x}_p, o_j \in \bar{o}_q} y_{i,j,t}, \forall\, p, r, t. \quad (5)$$

The downstream analyses results using these task-shares, $y_{i,j,t}$, as well as the aggregated task-shares, $\bar{y}_{p,q,t}$ and $\tilde{y}_{p,r,t}$, are presented in the following section.

Experimental Results

The impact of technology on labor markets has long been an important issue for economic theory, empirics, and policy. Perhaps even more important to those that make up the labor market, employers and employees, is that the advent of Artificial Intelligence (AI) will shift the demand for labor skills. It is desirable to understand the extent and nature of the changes so that society can prepare today for the jobs of tomorrow. While most jobs will change as AI and new technologies continue to scale across businesses and industries, so far what is mainly seen is task shifts within occupations instead of their disappearance. In our experiments, we considered how occupations are transforming by studying the evolution dynamics of the task-shares that compose the jobs.

Figure 7:
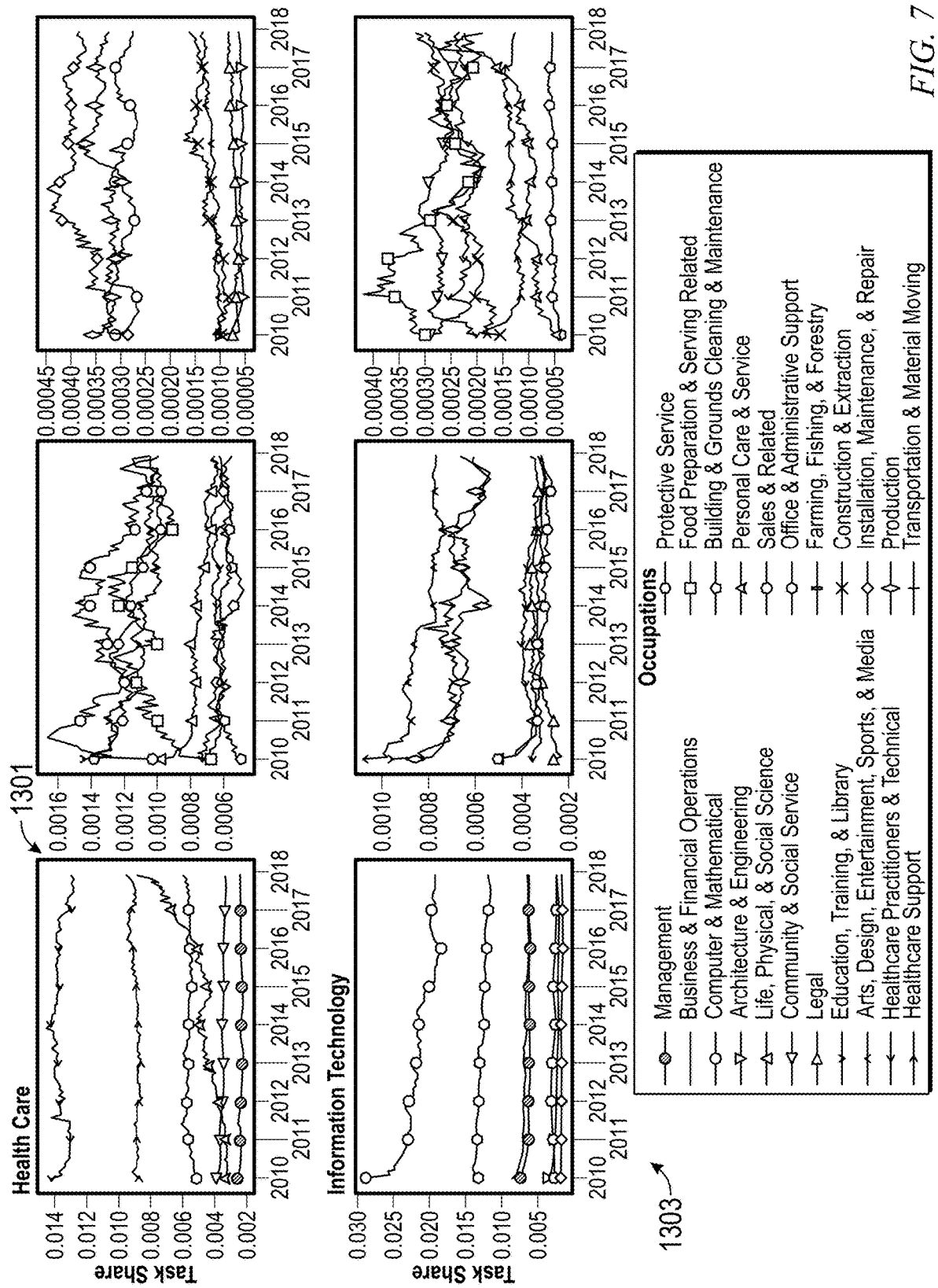
FIG. 7 shows exemplary task share versus time for health care and information technology.

Task Reorganization Among Workers:

Among the tens of task cluster families, we show in FIG. 7 how aggregated task-shares $\bar{y}_{p,q,t}$ of two example cluster families, $x_p$=Health Care 1301 and Information Technology 1303, have evolved between 2010-2018 across different (2-digit SOC) occupation families. To remove noise, to leverage finely-grained variation between time steps and to better expose the task-shares, we employed a moving average smoothing function with a window of 3 months for all the task-share figures. The growth and decline rates of the task-shares were measured in terms of normalized coefficients by fitting a linear regression to the task-shares.

The health care task cluster family has its highest shares in 'Healthcare Practitioners & Technical,' 'Healthcare Support,' 'Office & Administrative Support,' 'Personal Care & Service,' and, 'Community & Social Service' occupations (in order of demand). On the other end, its lowest shares are in 'Architecture & Engineering,' 'Legal,' 'Construction & Extraction,' and 'Arts, Design, Entertainment, Sports, & Media' Occupations. These findings are in line with what one would expect and are easily extendable to other cases. Based on the regression coefficients in the table of FIG. 8, it is evident that the healthcare task-share has seen a significant growth in 'Personal Care & Service' occupation, along with considerable growths in 'Legal,' 'Construction & Extraction,' and 'Arts, Design, Entertainment, Sports, & Media' occupations and decline in 'Sales & Related' jobs.

In FIG. 7 view 1303, the Information Technology (IT) task cluster family has its highest shares in 'Computer & Mathematical Operations,' 'Office & Administrative Support,' 'Business & Financial Operations,' and 'Management' occupations, with declining demand in 'Computer & Mathematical Operations' occupations. IT has its lowest, yet steadily-growing shares in 'Personal Care & Service' and 'Construction & Extraction' occupations, as in the table of FIG. 8. These results are consistent with the anecdotal evidence of increased IT penetration of a variety of occupations as well as IT being a GPT.

Figure 12:
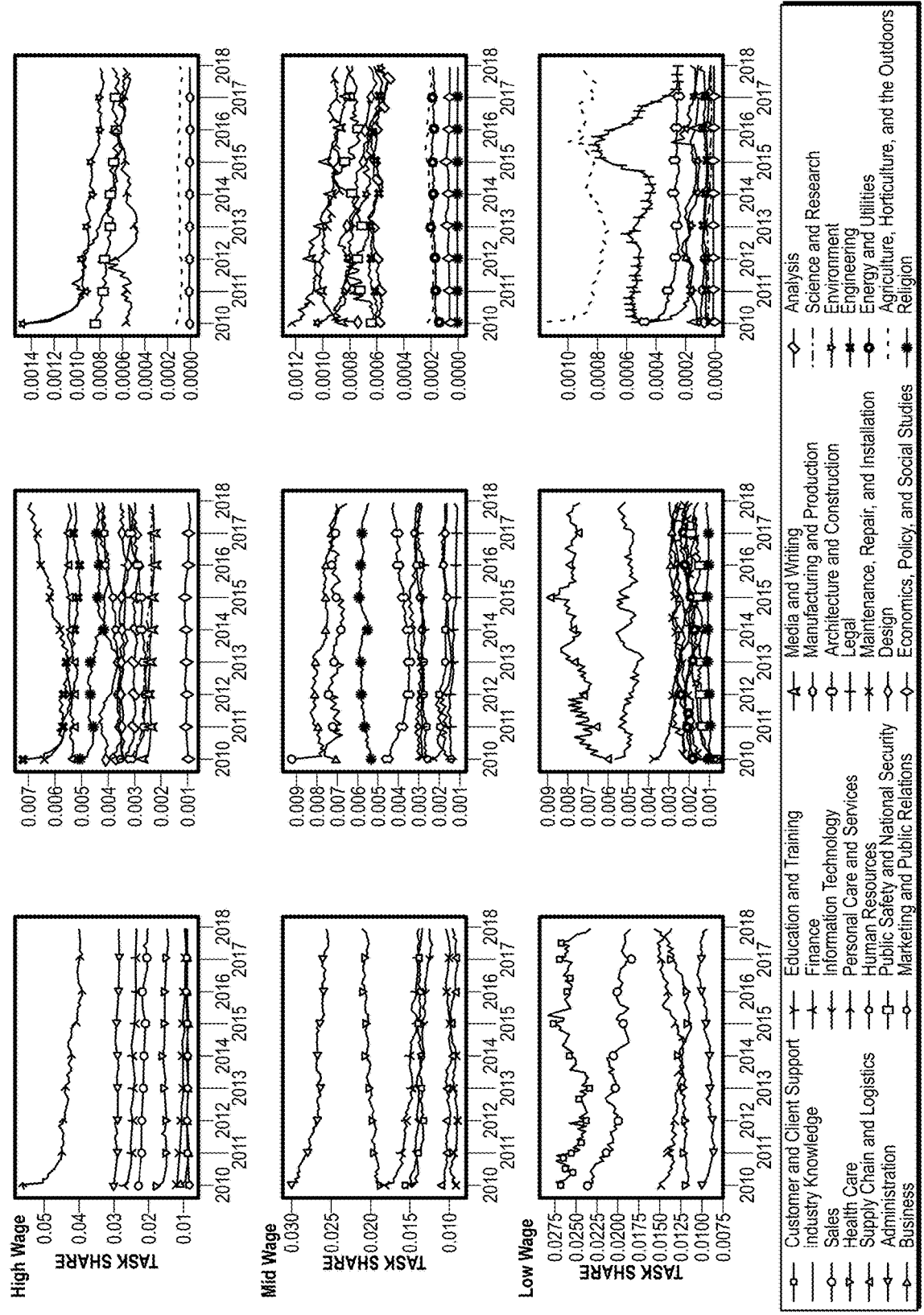
FIG. 12 shows task-share dynamics of task cluster families across: (a) high, (b) medium, and, (c) low wage occupation groups.

High and Low Wage Jobs are Gaining Tasks:

In the interest of studying how task-shares of different task cluster families have evolved across occupations with different wages levels, FIG. 12 displays the evolution of aggregated task-shares $\tilde{y}_{p,q,t}$ across wage terciles (low, medium, high). The top five task-shares for high wage occupations are 'Information Technology,' 'Business,' 'Finance,' 'Sales,' and 'Health Care'; for mid-wage occupations they are 'Administration,' 'Health Care,' 'Finance,' 'Customer Client Support,' and 'Information Technology'; and for low-wage jobs they are 'Customer Client Support,' 'Sales,' 'Care Services,' 'Health Care,' and 'Administration.' Although the 'Maintenance, Repair, & Installation' and 'Human Resources' task cluster families had small task-shares in both high-wage and low-wage occupations, they still saw a steady and significant growth in demand. Comparable growth also happened for 'Architecture & Construction' & 'Customer & Client Support' in high-wage jobs, and, 'Business' & 'Public Safety & National Security,' 'Engineering' in low-wage jobs. The regression coefficients in the table of FIG. 9 provide additional details. Notably, for mid wage occupations, most task cluster families experienced declines. Such a transition in the task-shares among wage-based occupation groups indicates that mid wage occupations are losing shares overall, and that task-shares in high and low wage occupations are growing.

Figure 13:
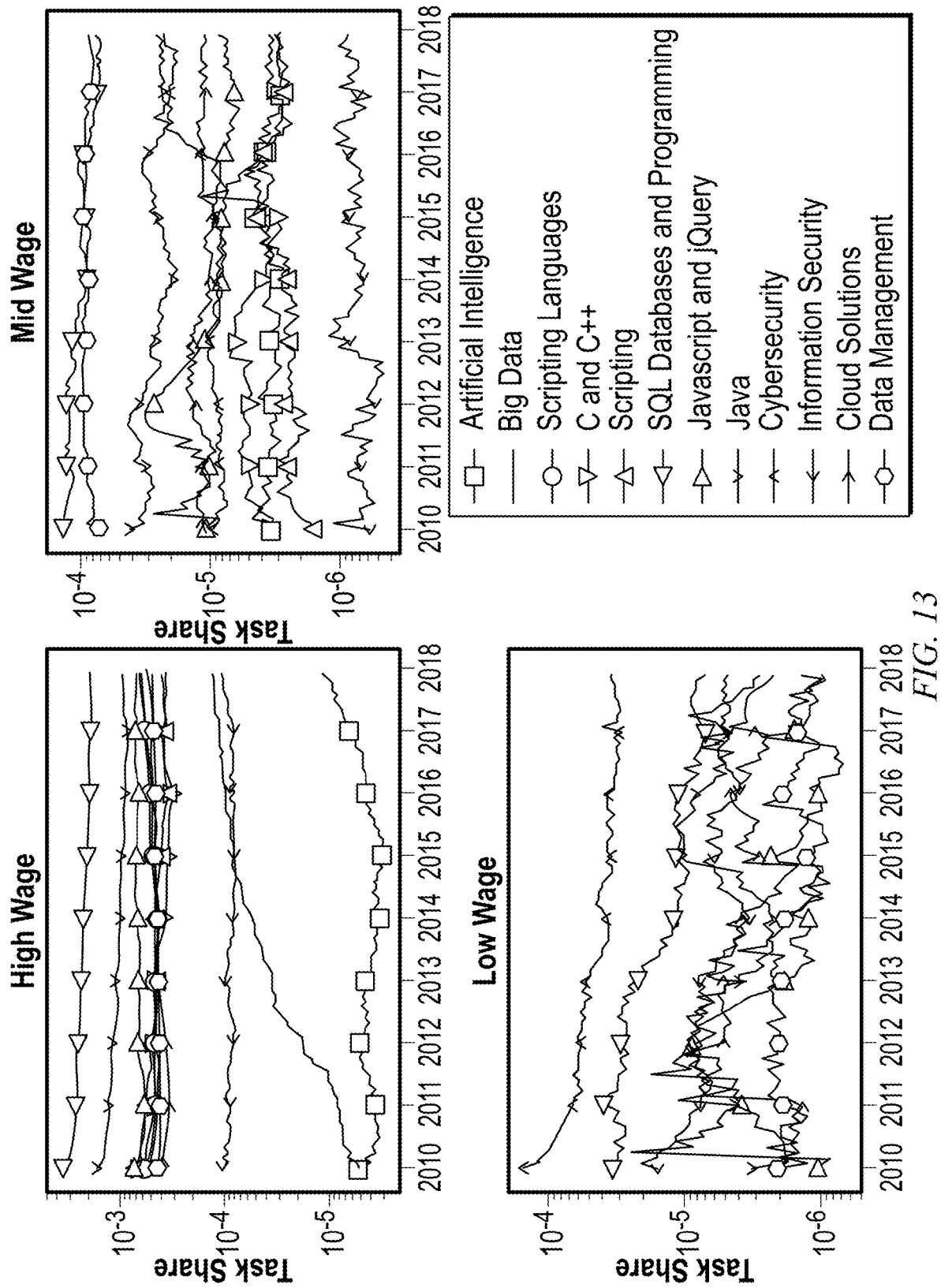
FIG. 13 shows task share dynamics of different Information Technology task clusters across HML wage occupations.

AI and Related IT Technologies:

To study how AI and related technologies are impacting the labor market at the initial phase of adoption, in our experiments, we zoomed into the Information Technology (IT) task cluster family to look at specific task clusters. FIG. 13 plots the task-shares of selected task clusters within the IT task cluster family across high, mid and low (HML) wage occupations. Although the 'SQL Databases and Programming,' 'Java' and 'JavaScript & jQuery' task clusters have the highest shares in high and mid wage occupations, their demand is steadily declining, see the table of FIG. 10. In contrast, even though the 'Artificial Intelligence' and 'Big Data' task clusters had low task-shares in the high wage occupations, their demand increased at a very high rate during 2010-2018. These task-clusters have not seen any demand in the mid and low wage occupations. On the one hand, task clusters like Scripting Languages' (includes Python) and 'Cloud Solutions' are gaining task-shares in high wage occupations. On the other hand, most IT task clusters are losing task-shares in low-wage occupations. This evolution of IT task demands confirms the industry trends towards developing AI-based products and services in the Cloud requiring workers to perform AI, Big Data, Scripting Languages, and Cloud Solutions based tasks while focusing less on traditional software products and services that require workers to perform SQL, Java, and Data Management oriented tasks.

Task-Share Forecasting:

In addition to the insights already extracted, this experiment and dataset lays down the scope and foundation for detailed exploration of the evolution of occupations (and the tasks within) across different industries in the US (or other) labor market. The task-shares time-series data creates an opportunity to learn the dynamics of task and occupations, and then quantitatively predict the task-shares for near future with confidence bounds. Such predictive capabilities on the labor market might help the workers reskill themselves, corporations retrain their employees, or new graduates to learn the skills to be able to execute the tasks of the future.

In the first phase of this study, we trained an autoregressive integrated moving average (ARIMA) model to learn the representation dynamics of the task-shares of different task cluster families across HML wage occupations over the first 72 months of data (2010-2016). Using this trained ARIMA model, we made one-month-ahead predictions of the task-shares. The mean absolute percentage error (MAPE) of predictions is considerably less than 5% in most cases as shown in the table of FIG. 11. FIG. 3 plots the task-share forecasts (solid lines 447 at the right of each curve) with 95% confidence intervals (shaded areas 448) to compare against the true task-shares (dotted lines 449) for a few selected task cluster families across high-, mid-, and low-wage occupations 441, 443, 445. The accuracy of the task-share predictions is a clear indicator towards the benefit of developing robust and more accurate forecasting models to characterize the evolution of occupations and the tasks therein.

Given the discussion thus far, it will be appreciated that, in general terms, an exemplary method, according to an aspect of the invention, includes obtaining, as input, in electronic form, structured information (e.g., output of block 403) including tasks for a plurality of occupations in a plurality of industries over a length of time; and computing, from the structured information, a time series of normalized occupation task shares $y_{ijt}$ over the length of time (e.g., with block 407). A further step (as at 409) includes training a computerized machine learning model, on the time series, to predict future task shares for the plurality of occupations in the plurality of industries. An even further step includes, as at 411, with the trained computerized machine learning model, predicting the future task shares.

One or more embodiments include learning the dynamics of the task shares using a training corpus and a test corpus—for example, one could pick data from 2010-2015 as the training corpus and data from 2016-2018 as the test corpus—train on a first time period and try to predict a second time period and see how well the system performs.

Predicting the future task shares can include, for example, predicting the future task shares for at least one of the plurality of occupations and/or predicting the future task shares includes predicting the future task shares for at least one of the plurality of industries.

One or more embodiments further include generating the structured information by using a computerized natural language processing system (e.g., block 403) to extract, from electronic job postings 401, the tasks for the plurality of occupations in the plurality of industries over the length of time.

In one or more embodiments, computing the time series $y_{ijt}$ includes determining a count of mentions $n_{i,j,t}$ of each given one of the tasks in each given one of the plurality of occupations for each of a plurality of discrete time periods within the length of time; determining a count of mentions $m_{j,t}$ of each given one of the plurality of occupations for each of the plurality of discrete time periods within the length of time; determining an occupation task share $z_{i,j,t}$ of workers in each of the occupations that perform each of the tasks by dividing the counts of mentions of the tasks by the counts of mentions of the occupations; and normalizing the occupation task shares by a labor force share $e_{j,t}$ to obtain the time series.

Training the computerized machine learning model can include, for example, applying an autoregressive integrated moving average (ARIMA) model, applying a long short term memory (LSTM), or the like. Indeed, given the teachings herein, any suitable time-series-based machine learning model can be used.

In one or more embodiments, the training includes learning cross-covariances among the tasks.

One or more embodiments further include generating a computerized alert to a user, based on the predicting step, to alert the user to obtain training to update skills of the user. For example, send the user a message over network adapter 20 discussed below to tell the user that PYTHON programming skills are in increased demand and the user should take continuing education classes about PYTHON, or that quantum computing skills are in increased demand and the user should take continuing education classes about quantum computing.

In some cases, the plurality of occupations in the plurality of industries relate to information technology, and a further step includes reconfiguring an information technology system based on the predicted future task shares. Furthermore, reconfiguring the information technology system could include deploying additional hardware and/or software resources and/or sunsetting other hardware and/or software resources—for example, additional artificial intelligence hardware accelerator units (e.g., GPUs (graphics processing units)) could be deployed responsive to an increase in predicted future task shares for artificial intelligence. This could, for example, be in proportion to the predicted increased demand; if demand is expected to double, the hardware accelerator capacity is doubled, and so on. Refer also to the discussion of cloud computing resources herein for additional examples of reconfiguring an information technology system.

One or more embodiments thus improve the technological process of computerized machine learning for skills and tasks demand forecasting by making predictions based on task shares time series.

Furthermore regarding dynamical aspects, there can be, for example, 12-15K unique tasks across different occupations. There are thousands of unique occupations falling under various occupation families. In the information technology (IT) Occupation Family, there are different types of occupation such as application developer, software engineer, systems engineer, etc. The demand for different tasks such as PYTHON developer, cloud computing, etc. can be studied and demand for individual tasks can be forecast. In practice, demand for PYTHON programming may go up when demand for JAVA or C++ goes down (generally, a coupling such that a rise in demand for one thing correlates to a drop in demand for another thing). The dynamical system model can be learned for each of the 12-15K unique tasks separately, or all together to better capture relationships between tasks, to improve forecasting ahead. For example, if it is seen that demand for object oriented programming (OOP) languages like JAVA and C++ is going down, demand for languages like PYTHON may be increasing. These insights can be obtained, for example, by training to learn the cross co-variances among the different variables.

It is worth noting that element 403 could obtain jobs data in a variety of ways; e.g., scraping blog posts.

In another aspect, an exemplary apparatus includes a memory (e.g., 30); a non-transitory computer readable medium (e.g., 34) including computer executable instructions; and at least one processor 16, coupled to the memory and the non-transitory computer readable medium, and operative to execute the instructions to be operative to carry out or otherwise facilitate any one, some, or all of the method steps described herein. The instructions could be such that they cause the processor to instantiate suitable modules as described with respect to FIG. 1, and the instantiated modules could carry out the steps as described herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 14:
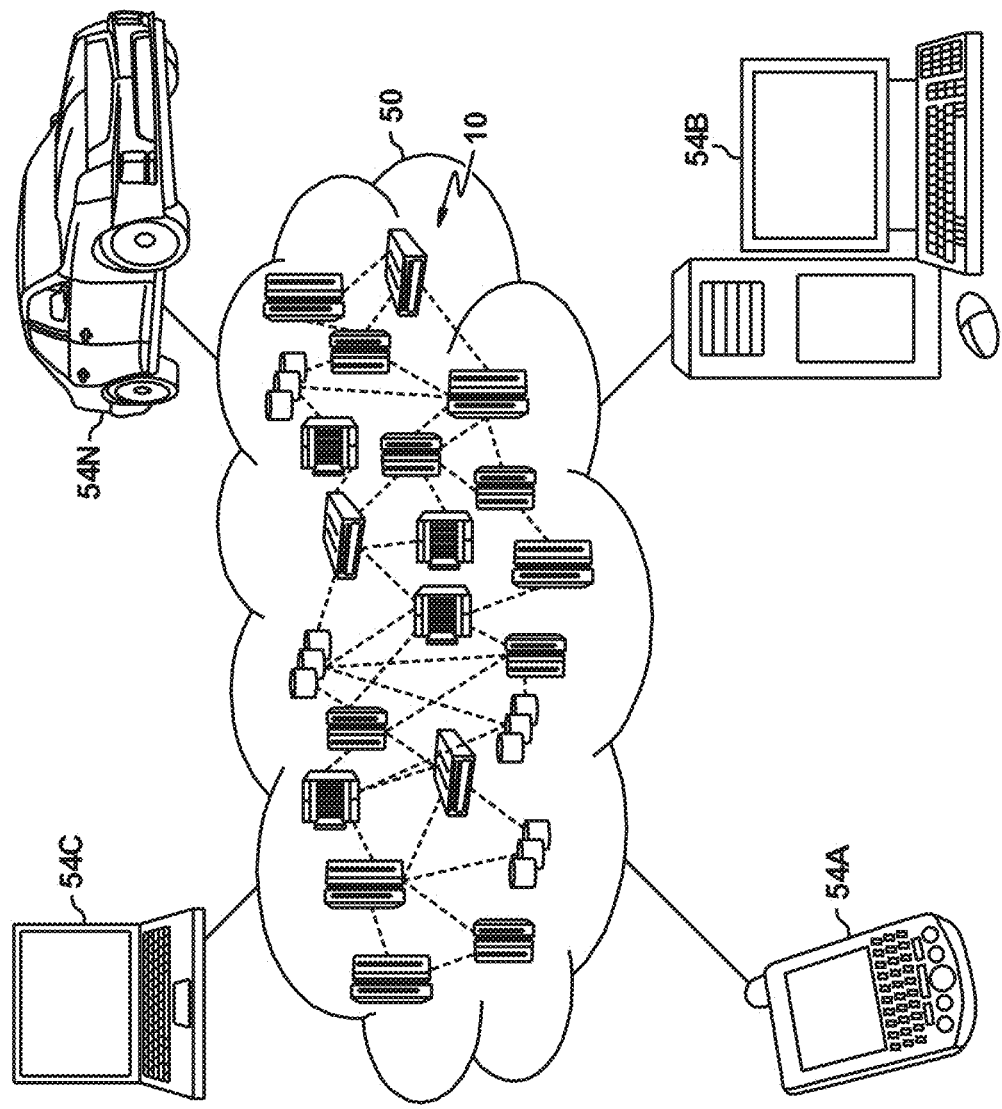
FIG. 14 depicts a cloud computing environment according to an embodiment of the present invention.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Figure 15:
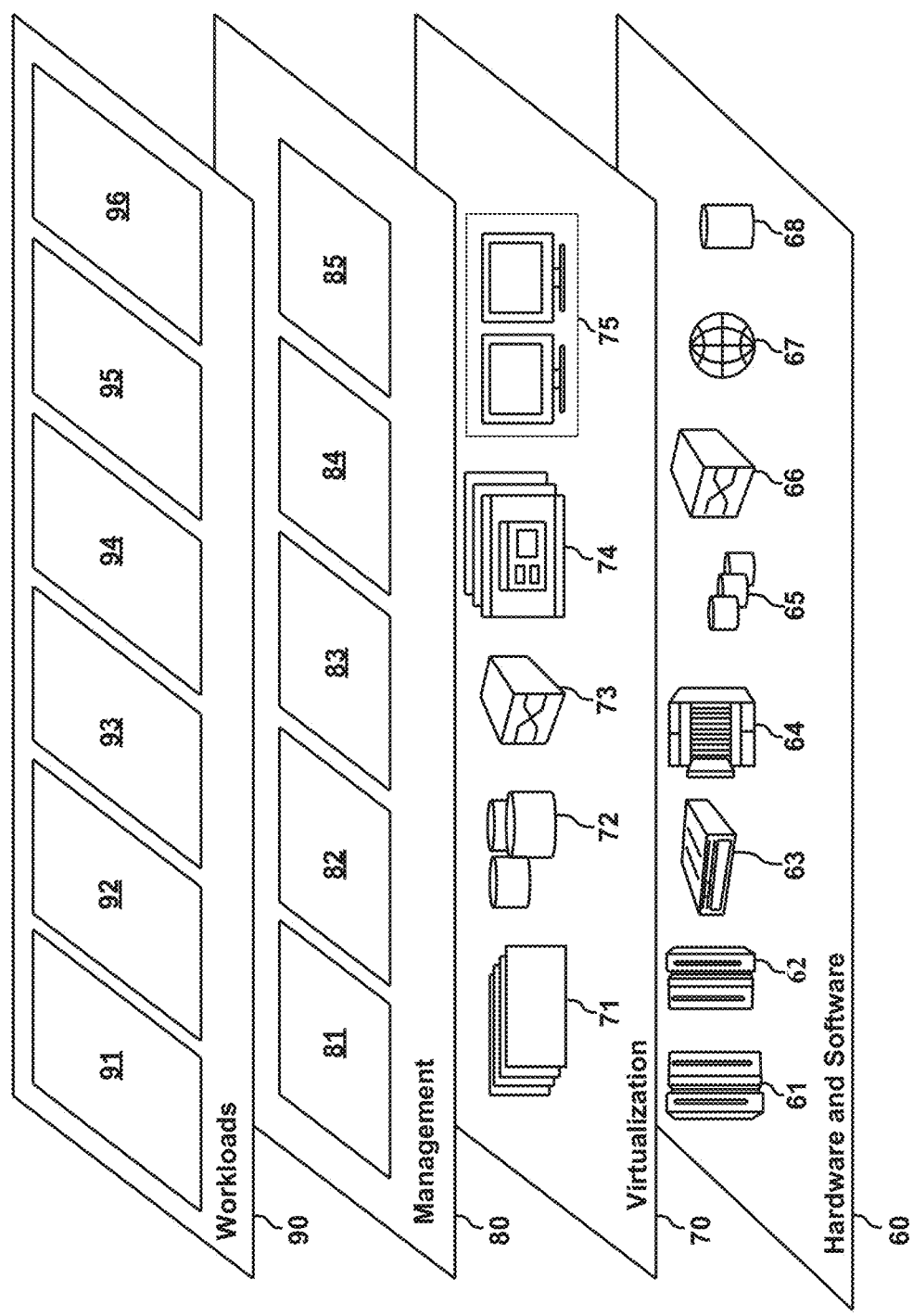
FIG. 15 depicts abstraction model layers according to an embodiment of the present invention.

Referring now to FIG. 15, a set of functional abstraction layers provided by cloud computing environment 50 (FIG. 1) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service 96 (or one or more elements thereof) to facilitate skills and tasks demand forecasting.

Figure 16:
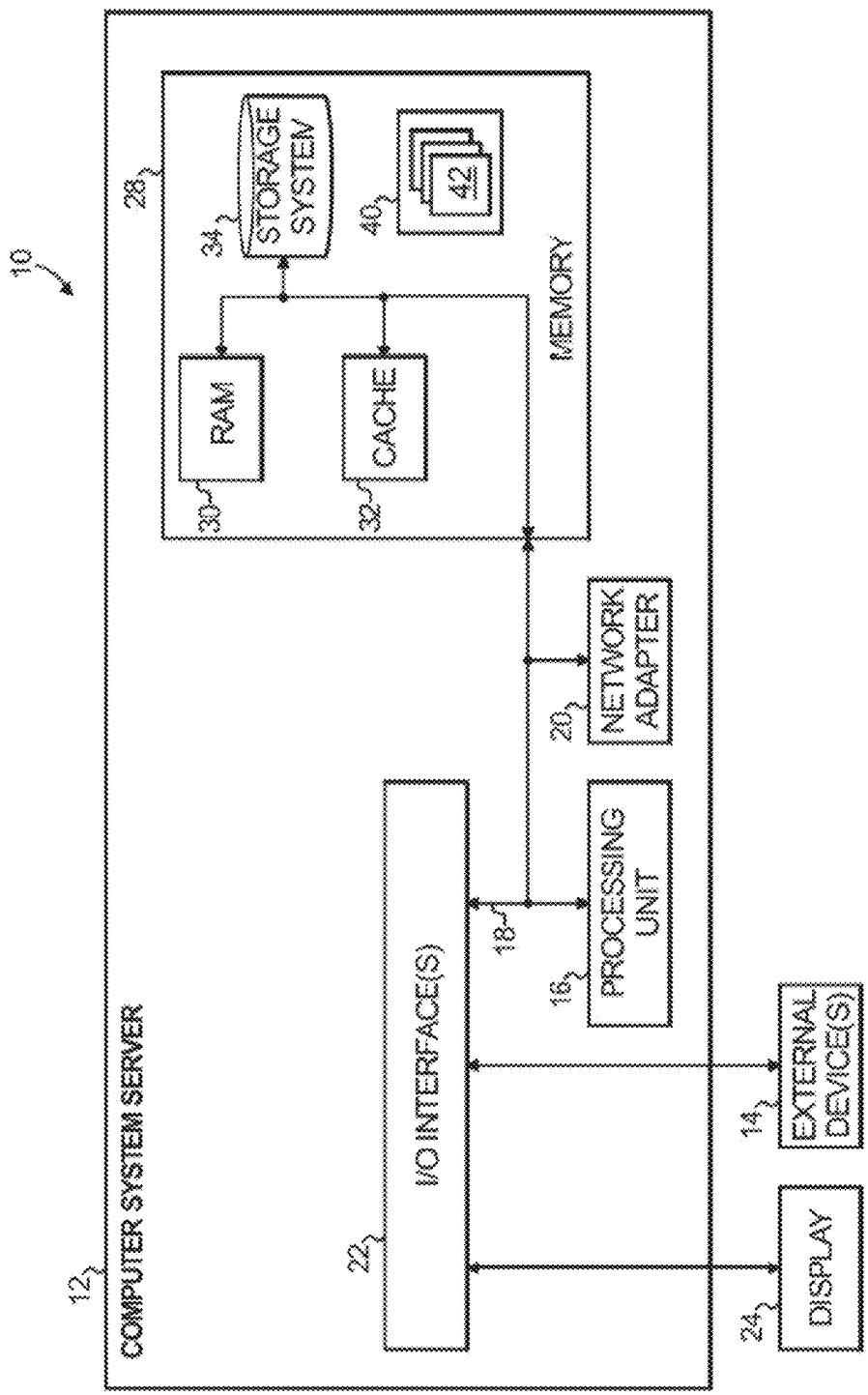
FIG. 16 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 16 depicts a computer system that may be useful in implementing one or more aspects and/or elements of the invention, also representative of a cloud computing node according to an embodiment of the present invention. Referring now to FIG. 16, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 16, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 16) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 15-16 and accompanying text. Consider, e.g., a cloud-based service 96 (or one or more elements thereof) to facilitate skills and tasks demand forecasting, located in layer 90.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI)(e.g., 413).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of improving the technological process of managing computer resources by reconfiguring an information technology (IT) system to meet future demand based on accurate inferences about said future demand, said method comprising:

obtaining, as input, in electronic form, structured information including tasks for a plurality of occupations in a plurality of industries related to information technology, over a length of time;

computing, from said structured information, a time series of normalized occupation task shares over said length of time, the computing including dividing counts of mentions of tasks by counts of mentions of occupations;

training a computerized machine learning model, on said time series, to predict future task shares for said plurality of occupations in said plurality of industries related to information technology, by applying an autoregressive integrated moving average (ARIMA) model wherein an architecture of the computerized machine learning model comprises an encoder that represents an intermediate layer implemented with a long short-term memory (LSTM) configured to transform the time series into another variable to capture couplings and parameters, and a decoder configured to produce the future task shares predictions based on an output of the encoder;

with said trained computerized machine learning model, predicting said future task shares and future demand for different types of computer-related tasks; and reconfiguring said information technology system based on said predicted future demand for different types of computer-related tasks by taking at least one action from the group consisting of:
  deploying additional hardware resources in a cloud computing environment; and
  deploying additional software resources in a cloud computing environment.

2. The method of claim 1, wherein predicting said future task shares comprises predicting said future task shares for at least one of said plurality of occupations.

3. The method of claim 1, wherein predicting said future task shares comprises predicting said future task shares for at least one of said plurality of industries.

4. The method of claim 1, further comprising generating said structured information by using a computerized natural language processing system to extract, from electronic job postings, said tasks for said plurality of occupations in said plurality of industries over said length of time.

5. The method of claim 4, wherein computing said time series comprises:
  determining the count of mentions of each given one of said tasks in each given one of said plurality of occupations for each of a plurality of discrete time periods within said length of time;
  determining the count of mentions of each given one of said plurality of occupations for each of said plurality of discrete time periods within said length of time;
  wherein the dividing of said counts of mentions of said tasks by said counts of mentions of said occupations determines an occupation task share of workers in each of said occupations that perform each of said tasks; and
  normalizing said occupation task shares by a labor force share to obtain said time series.

6. The method of claim 1, wherein said training comprises learning cross-covariances among said tasks.

7. The method of claim 1, further comprising generating a computerized alert to a user, based on said predicting step, to obtain training to update skills of said user.

8. The method of claim 1, wherein reconfiguring said information technology system comprises deploying additional artificial intelligence hardware accelerator units responsive to an increase in predicted future task shares for artificial intelligence.

9. A computer program product for improving the technological process of managing computer resources by reconfiguring an information technology (IT) system to meet future demand based on accurate inferences about said future demand, the computer program product comprising:
  one or more computer readable storage media, and program instructions collectively stored on the one or more computer readable storage media, the program instructions comprising:
  program instructions to obtain, as input, in electronic form, structured information including tasks for a plurality of occupations in a plurality of industries related to information technology, over a length of time;
  program instructions to compute, from said structured information, a time series of normalized occupation task shares over said length of time, the computing including dividing counts of mentions of tasks by counts of mentions of occupations;
  program instructions to train a computerized machine learning model, on said time series, to predict future task shares for said plurality of occupations in said plurality of industries related to information technology, by applying an autoregressive integrated moving average (ARIMA) model wherein an architecture of the computerized machine learning model comprises an encoder that represents an intermediate layer implemented with a long short-term memory (LSTM) configured to transform the time series into another variable to capture couplings and parameters, and a decoder configured to produce the future task shares predictions based on an output of the encoder;
  program instructions to, with said trained computerized machine learning model, predict said future task shares and future demand for different types of computer-related tasks; and
  program instructions to reconfigure said information technology system based on said predicted future demand for different types of computer-related tasks by taking at least one action from the group consisting of:
    deploying additional hardware resources in a cloud computing environment; and
    deploying additional software resources in a cloud computing environment.

10. An apparatus for improving the technological process of managing computer resources by reconfiguring an information technology (IT) system to meet future demand based on accurate inferences about said future demand, the apparatus comprising:
  a memory;
  a non-transitory computer readable medium comprising computer executable instructions; and
  at least one processor, coupled to said memory and said non-transitory computer readable medium, and operative to execute said instructions to be operative to:
    obtain, as input, in electronic form, structured information including tasks for a plurality of occupations in a plurality of industries related to information technology, over a length of time;
    compute, from said structured information, a time series of normalized occupation task shares over said length of time, the computing including dividing counts of mentions of tasks by counts of mentions of occupations;
    train a computerized machine learning model, on said time series, to predict future task shares for said plurality of occupations in said plurality of industries related to information technology, by applying an autoregressive integrated moving average (ARIMA) model wherein an architecture of the computerized machine learning model comprises an encoder that represents an intermediate layer implemented with a long short-term memory (LSTM) configured to transform the time series into another variable to capture couplings and parameters, and a decoder configured to produce the future task shares predictions based on an output of the encoder;

with said trained computerized machine learning model, predict said future task shares and future demand for different types of computer-related tasks; and reconfigure said information technology system based on said predicted future demand for different types of computer-related tasks by taking at least one action from the group consisting of:

deploying additional hardware resources in a cloud computing environment; and deploying additional software resources in a cloud computing environment.

11. The apparatus of claim 10, wherein predicting said future task shares comprises predicting said future task shares for at least one of said plurality of occupations and/or at least one of said plurality of industries, wherein said at least one processor is further operative to generate said structured information by using a computerized natural language processing system to extract, from electronic job postings, said tasks for said plurality of occupations in said plurality of industries over said length of time.

12. The apparatus of claim 10, wherein computing said time series comprises:

determining the count of mentions of each given one of said tasks in each given one of said plurality of occupations for each of a plurality of discrete time periods within said length of time;

determining the count of mentions of each given one of said plurality of occupations for each of said plurality of discrete time periods within said length of time;

wherein the dividing of said counts of mentions of said tasks by said counts of mentions of said occupations determines an occupation task share of workers in each of said occupations that perform each of said tasks; and normalizing said occupation task shares by a labor force share to obtain said time series.

13. The apparatus of claim 10, wherein said training comprises learning cross-covariances among said tasks.

14. The apparatus of claim 10, wherein said at least one processor is further operative to generate a computerized alert to a user, based on said predicting, to obtain training to update skills of said user.

15. The apparatus of claim 10, wherein reconfiguring said information technology system comprises deploying additional artificial intelligence hardware accelerator units responsive to an increase in predicted future task shares for artificial intelligence.

\* \* \* \* \*